United States Patent [19]

Umemura et al.

[11] Patent Number: 5,107,163
[45] Date of Patent: Apr. 21, 1992

[54] ULTRASONIC MOTOR

[75] Inventors: Chiaki Umemura, Toyohashi; Yasuo Kuwabara, Midori; Akemi Okawa, Obu, all of Japan

[73] Assignee: Aisin Seiki Kabushiki Kaisha, Kariya, Japan

[21] Appl. No.: 553,426

[22] Filed: Jul. 17, 1990

[30] Foreign Application Priority Data

Jul. 17, 1989 [JP] Japan ............................ 1-185628

[51] Int. Cl.⁵ .............................................. H01L 41/08
[52] U.S. Cl. ........................................................ 310/323
[58] Field of Search ................................... 310/323, 328

[56] References Cited

U.S. PATENT DOCUMENTS

| 4,649,311 | 3/1987 | Mukohjima et al. | 310/328 X |
| 4,734,610 | 3/1988 | Okumura et al. | 310/328 X |
| 4,831,305 | 5/1989 | Mukohjima et al. | 310/323 |

FOREIGN PATENT DOCUMENTS

| 0189176 | 8/1986 | Japan | 310/323 |
| 0048276 | 3/1987 | Japan | 310/323 |
| 0209963 | 8/1989 | Japan | 310/323 |

Primary Examiner—Mark O. Budd
Attorney, Agent, or Firm—Burns, Daone, Swecker & Mathis

[57] ABSTRACT

An ultrasonic motor is provided which generates oscillations in only two directions so as to more efficiently provide for the transmission of driving torque from the driving member to the driven rotor member. The motor includes a stator having a driving portion on a side surface of the stator and a vibrating member for generating radial and circumferential oscillations on the stator member. A rotor is urged against the driving portion of the stator and a further member is provided which continually urges the rotor against the stator so as to provide for the transmission of drive between the rotor and stator.

6 Claims, 3 Drawing Sheets

ULTRASONIC MOTOR

BACKGROUND OF THE INVENTION

1. Field of the Invention

This invention relates to an ultrasonic motor which drives a rotor by a traveling wave generated on a stator.

2. Description of the Related Art

A known ultrasonic motor is disclosed in, for example, Japanese Laid-open Patent Publication No. 63-73887 published on Apr. 4, 1988.

FIG. 6 is a cross-sectional view of the known ultrasonic motor. FIG. 7a is a plan view showing radial and circumference movements of the known stator. FIG. 7b is a cross-sectional view showing axial movement of the known stator. Referring to these figures, three dimensional movements of the known stator will be explained.

Referring to FIG. 6, an external housing comprises a case 41 and a cover 42. A stator 43 is rigidly connected to the cover 42. A thick driving portion 51 is provided on the outer circumference of the stator 43. The driving portion 51 includes a plurality of equally pitched or spaced projections 49 which are integrally formed on the stator 43. A pair of piezoelectric elements 44 are adhered to the driving portion 51. A friction film 46, bonded to a rotor 45, is pinched or held between each of the projections 49 and the rotor 45. A spindle 47 has a guard portion 48 for supporting a disc spring 50. The disc spring 50 is pinched or held between the guard portion 48 and the rotor 45. The disc spring 50 presses the rotor 45 to the stator 43. The rotor 43 integrally rotates with the disc spring 50 and the spindle 47. When electric power is applied to the piezoelectric elements 44, a traveling wave is generated on the driving portion 51 of the stator 43 due to deformation of the piezoelectric elements 44. The projections 49 are oscillated not only along a circumference direction A but also in a radial direction B due to the traveling wave which is generated on the driving portion 51. These directions of oscillation are shown in FIG. 7a. In FIG. 7a, dotted lines show the positions of the projections 49 before the traveling wave is generated on the driving portion 51. In addition to these two directions of oscillation, the projections 49 are also oscillated in the thickness or axial direction C as shown in FIG. 7b.

Due to these three dimensional oscillations A, B, C, the driving portion 51 makes a spherical locus with respect to a point D on the stator 43. However, only two dimensional oscillations are required for generating the traveling wave. Therefore, in the conventional ultrasonic motor shown in FIG. 6, the oscillation in the thickness direction C is useless for generating the traveling wave and wastes the supplied energy.

SUMMARY OF THE INVENTION

Accordingly, one of the objects of the present invention is to obviate the above conventional drawbacks.

Further, one of the objects of the present invention is to generate oscillations in only two directions for generating the traveling wave.

Furthermore, one of the objects of the present invention is to improve efficiency of the ultrasonic motor.

To achieve the above objects and in accordance with the principles of the invention as embodied and broadly described herein, the ultrasonic motor comprises a stator having a driving portion on a side surface, a vibrating member for generating radial and circumference oscillations, a rotor urged against the driving portion, and, a pressing member for pressing the rotor to the stator.

BRIEF DESCRIPTION OF THE DRAWINGS

The accompanying drawings, which are incorporated in and constitute a part of the specification, illustrate an embodiment of the invention, serve to explain the principles of the invention. Of the drawings.

DETAILED DESCRIPTION OF THE PREFERRED EMBODIMENTS

Reference will now be made in detail to the present preferred embodiment of the invention, an example of which is illustrated in accompanying drawings.

Figure 1:
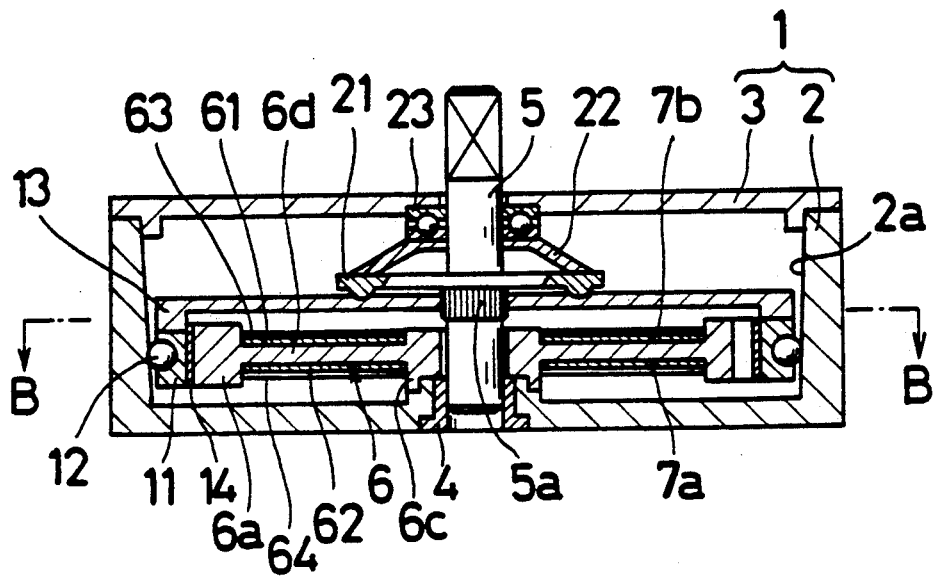
FIG. 1 is a cross-sectional view showing an ultrasonic motor of the present invention.

As shown in FIG. 1, a housing 1 of an ultrasonic motor comprises a base 2 and a cover 3. A metal bearing 4 is pressed into a center of the base 2. A spindle 5 is supported by the metal bearing 4. The spindle 5 can rotate with respect to the base 2.

Figure 2:
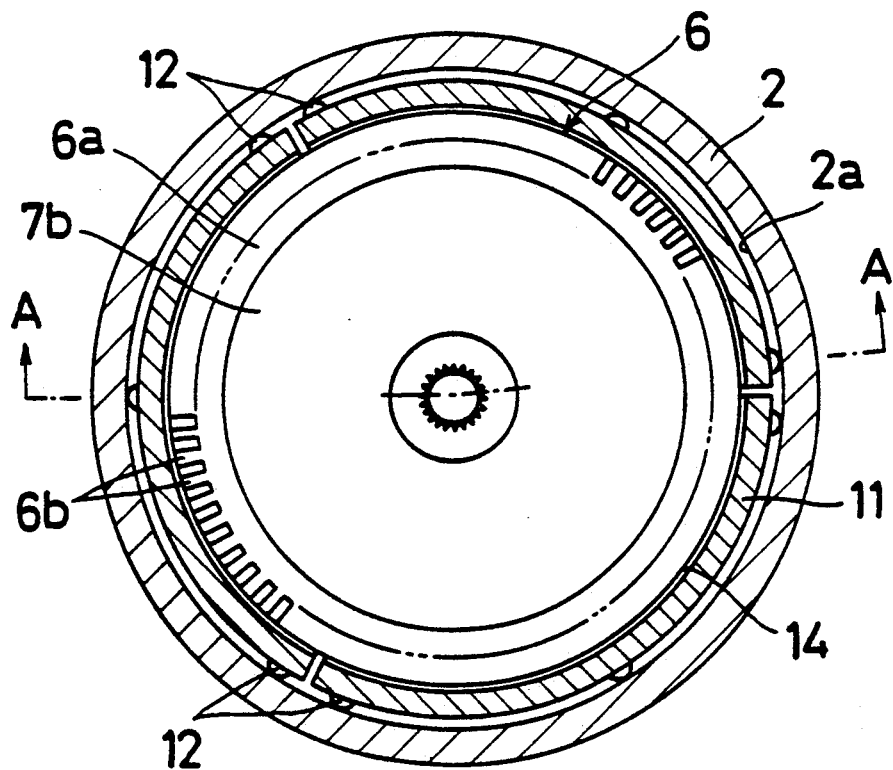
FIG. 2 is a cross-sectional view taking along line B—B in FIG. 1.
Figure 4:
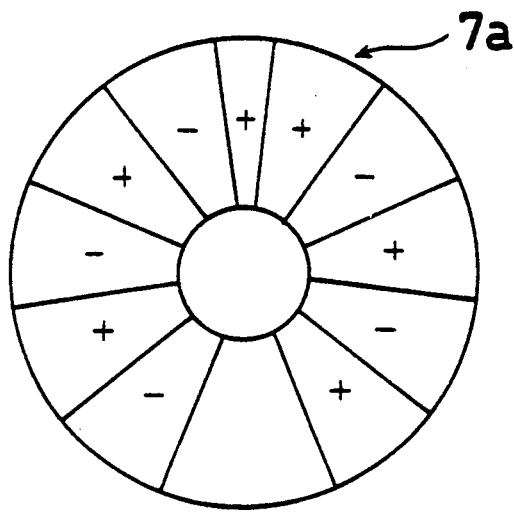
FIG. 4 is a plane view of the piezoelectric vibrator showing an example of polarization construction.

An elastic disc 6 comprises a driving portion 6a and a central portion 6c interconnected by an inner portion 6d. The driving portion 6a includes a plurality of equally pitched or spaced projections 6b as shown in FIG. 2. Those projections are separated by recesses 6b' which are closed at their radially inner ends. The central portion 6 is rigidly fixed to the base 2. A pair of piezoelectric vibrators 7a, 7b are bonded to opposite planes 61, 62 of the elastic disc 6. The piezoelectric vibrators 7a, 7b contact the driving portion 6a and the central portion 6c in order to transmit the oscillation of the piezoelectric vibrators 7a, 7b effectively. The piezoelectric vibrator 7a is a ring shaped ceramic element which includes eleven polarized portions as shown in FIG. 4. The piezoelectric vibrator 7b is the same as the piezoelectric vibrator 7a. The piezoelectric vibrators 7a, 7b are bonded to the elastic disc 6 by a conductive adhesive in order to use the elastic disc 6 and the base 2a for a power supply terminal. A pair of flexible circuit boards 63, 64 for providing a power supply are bonded to the piezoelectric vibrators 7a, 7b by a conductive adhesive.

Accordingly, when the electric power is applied to the piezoelectric vibrators 7a, 7b, the piezoelectric vibrators 7a, 7b are expanded and contracted in the radial and circumference directions. A traveling wave is generated on the elastic disc 6 due to the expansion and contraction of the piezoelectric vibrators 7a, 7b.

In this embodiment, a stator is defined by the elastic disc 6, the driving portion 6a and the projections 6b.

Three sectors 11 are provided between the driving portion 6a and the base 2. Each sector 11 has a plurality of small balls or roller elements 12 which can rotate between the sectors 11 and the base 2. The small balls 12 contact a tapered inner side surface 2a of the base 2. A disc spring 22 presses a guard portion 21 of the spindle 5 toward the bottom of the base 2. The guard portion 21 contacts and presses supporting disc 13 and the supporting disc 13 has a leg portion which contacts the sectors 11. The small balls 12 press each sector 11 to the driving portion 6a since the small balls 12 are in contact with the tapering inner surface 2a. Each sector 11 is provided with a friction film 14 which increases the friction force between the driving portion 6a and each sector 11.

In this embodiment, a rotor is defined by sector 11, the supporting disc 13 and the spindle 5. Further, a pressing member is defined by the disc spring 22, the supporting disc 13 and the tapered surface 2a.

The supporting disc 13 has three projections (not shown) at 120 degree intervals. The three projections are designed so as to extend between and separate the sectors 11. Therefore, the rotation of the sectors 11 is transmitted to the supporting disc 13.

The supporting disc 13 has a serration (not shown) which is engaged with a serrated or splined portion 5a of the spindle 5. Therefore, the supporting disc 13 can be adjusted coaxially with respect to the spindle 5 so as to adjust the pressure for pressing the sectors 11 to the driving portion 6a. However, the supporting disc 13 cannot rotate independently from the spindle 5 so as to prevent the transmission of rotation from the supporting disc 13 to the spindle 5.

Figure 3:
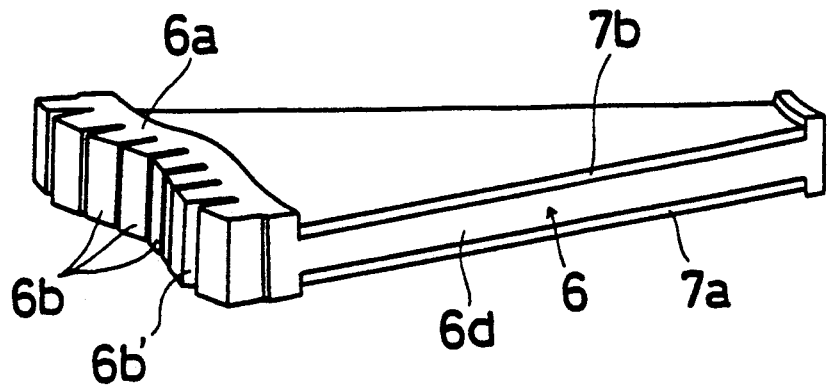
FIG. 3 is a perspective view showing a stator when a traveling wave is generated.

When the electric power is supplied to the piezoelectric vibrators 7a, 7b, the traveling wave is generated on the driving portion 6a. The traveling wave circulates across the driving portion 6a. As shown in FIG. 3, the driving portion 6a deforms in the radial direction of the elastic disc 6 due to the traveling wave. The projections 6b amplify the amplitude of the traveling wave. The movement of the projections 6b provides a rotational moment to the sectors 11. Thus, the sectors 11 start rotating.

In this embodiment, a pair of piezoelectric vibrators 7a, 7b are located on opposite planes or sides 61, 62 of the elastic disc 6. Further, the piezoelectric vibrators 7a, 7b are oscillated symmetrically. Therefore, the elastic disc 6 does not deform in the axial or thickness direction since the same stresses are balanced between the opposite planes 61, 62 of the elastic disc 6. Accordingly, the vibration energy which is supplied to the piezoelectric vibrators 7a, 7b is not wasted and the amplitude of the traveling wave is efficiently increased, and large rotational moment is generated is affected to the sectors 11. As a result, the sectors 11, the supporting disc 13 and the spindle 5 can rotate efficiently.

In this embodiment, the piezoelectric vibrators 7a, 7b are not substantially subject to damage or wear since the piezoelectric vibrators 7a, 7b are not bent in the thickness direction. Further, the friction film 14 has an extended life since the projections 6b contact the friction film 14 perpendicularly. Furthermore, driving torque can be increased since the friction force is applied uniformly to the tops of the projections 6b.

Figure 5:
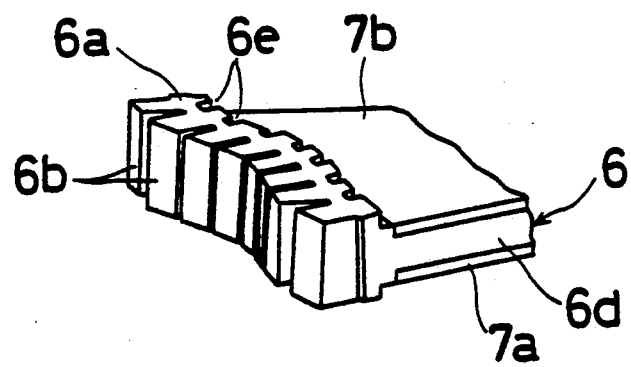
FIG. 5 is a plane view of the stator when a traveling wave is generated.
Figure 6:
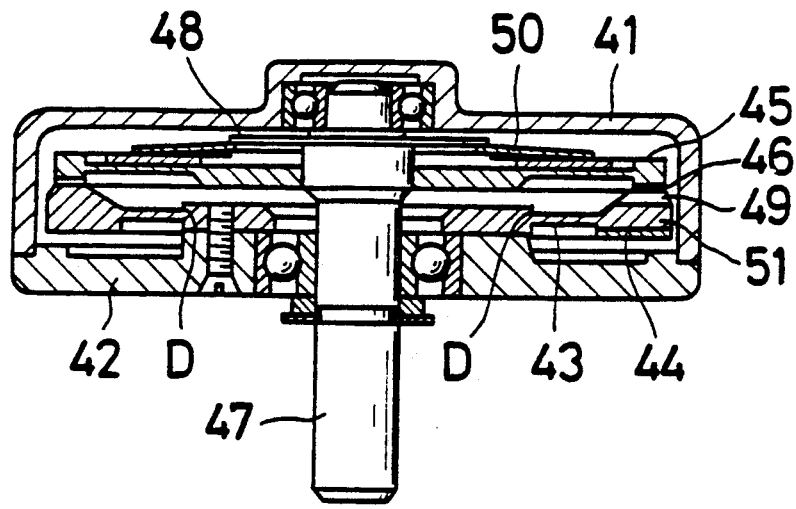
FIG. 6 is a cross-sectional view of a conventional ultrasonic motor.
Figure 7A:
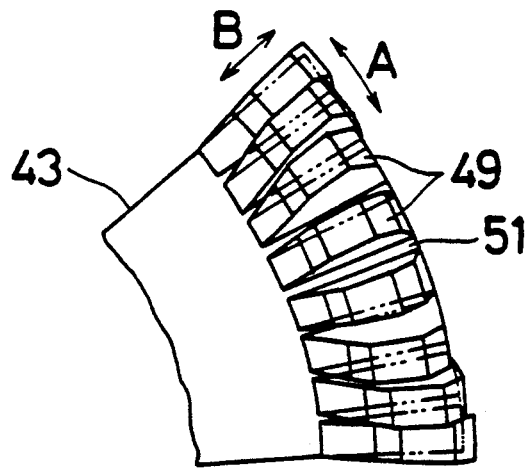
FIGS. 7a and 7b are perspective views of a conventional stator when a traveling wave is generated.
Figure 7B:
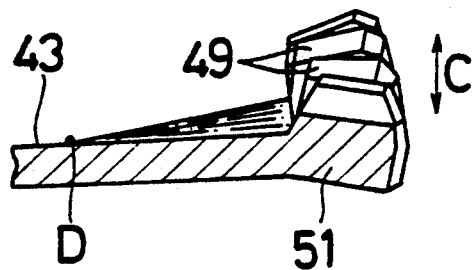

As shown in FIG. 5, auxiliary notches 6e can be formed on a radially inside part of the driving portion 6a in order to be soften or increase the flexibility of the driving portion 6a. The notches 6e have closed radially outer ends. If the auxiliary notches 6e are formed, the amplitude of the traveling wave can be increased. Thus, the sectors 11, the supporting disc 13, and the spindle 5 can rotate with ever greater efficiency.

Various modifications may be made in the invention without departing from the scope or spirit of the invention. Thus, the present invention can be adopted to a liner motor.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

We claim:

1. An ultrasonic motor comprising:
a stator including an elastic member having an inner portion and a drive portion disposed radially outwardly of said inner portion, said drive portion including a plurality of circumferentially spaced projections spaced apart by recesses, a plurality of circumferentially spaced notches formed in a radially inner part of said drive portion to facilitate deformation of said projections, said projections including radially outwardly facing surfaces;
a rotor pressed against said radially outwardly facing surfaces of said projections to be driven thereby about an axis;
means for pressing said rotor against said radially outwardly facing surfaces; and
vibrating means for inducing vibrations in said elastic member in a manner generating a traveling wave in said projections, said vibrating means including a pair of piezoelectric vibrators positioned on axially opposite surfaces of said inner portion and arranged such that axial vibrations thereof tend to balance one another in order to minimize axial deformation of said projections.

2. An ultrasonic motor according to claim 1, wherein said recesses are closed at their radially inner ends.

3. An ultrasonic motor according to claim 2, wherein a radially inner portion of said drive portion extends axially beyond said inner portion of said elastic member, said notches being formed in said radially inner portion, said notches having closed radially outer ends.

4. An ultrasonic motor according to claim 3 including a housing containing said stator, said rotor, and said vibrating means, said housing including a tapered inner surface arranged coaxially with said axis, said rotor including a supporting disc and sector means contacted by an outer peripheral portion of said supporting disc, said sector means being interposed radially between said tapered inner surface and said projections, said pressing means pressing said outer peripheral portion of said supporting disc against said sector means to press said sector means in the same direction that said tapered inner surface is tapered, so that said sector means is urged radially inwardly against said projections, and rolling elements interposed radially between said tapered inner surface and said sector means to facilitate rotation of said sector means.

5. An ultrasonic motor according to claim 4 including a housing containing said stator, said rotor, and said vibrating means, said housing including a tapered inner surface arranged coaxially with said axis, said rotor including a supporting disc and sector means contacted by an outer peripheral portion of said supporting disc, said sector means being interposed radially between said tapered inner surface and said projections, said pressing means pressing said outer peripheral portion of said supporting disc against said sector means to press said sector means in the same direction that said tapered inner surface is tapered, so that said sector means is urged radially inwardly against said projections, and rolling elements interposed radially between said tapered inner surface and said sector means to facilitate rotation of said sector means.

6. An ultrasonic motor according to claim 1, wherein said vibrators generate radial and circumferential vibrations in said projections.

* * * * *